United States Patent [19]

Robbins, III

[11] Patent Number: 4,860,996

[45] Date of Patent: Aug. 29, 1989

[54] COMPOSITE STRAND FENCE

[76] Inventor: Edward S. Robbins, III, 459 N. Court St., Florence, Ala. 35630

[21] Appl. No.: 8,659

[22] Filed: Jan. 30, 1987

Related U.S. Application Data

[63] Continuation-in-part of Ser. No. 643,008, Aug. 22, 1984, Pat. No. 4,684,107, and a continuation-in-part of Ser. No. 892,042, Aug. 1, 1986, Pat. No. 4,706,942.

[51] Int. Cl.$^4$ .............................................. A01K 3/00
[52] U.S. Cl. ....................................... 256/10; 256/48; 256/47
[58] Field of Search ........................ 256/10, 47, 48, 50

[56] References Cited

U.S. PATENT DOCUMENTS

| | | |
|---|---|---|
| 1,319,887 | 10/1919 | Metzko . |
| 3,223,796 | 12/1965 | Willoughby . |
| 3,293,800 | 12/1966 | Martinmaas . |
| 3,350,066 | 8/1967 | Cope . |
| 3,366,854 | 5/1968 | Robinson . |
| 3,516,643 | 6/1970 | Cox . |
| 3,669,413 | 6/1972 | Laible . |
| 4,111,399 | 7/1978 | Hutchison, III . |
| 4,182,382 | 1/1980 | Ingraham . |
| 4,465,263 | 8/1984 | Robbins, Jr. . |
| 4,533,120 | 8/1985 | Ruddock . |
| 4,755,633 | 7/1988 | Standing ............................ 256/10 X |

FOREIGN PATENT DOCUMENTS 571196  12/1957  Italy .................................... 256/13.1

OTHER PUBLICATIONS

United States Steel booklet entitled "How to Build Fences With Max-Ten 200 High-Tensile Fence Wire", 5-1980.

Primary Examiner—Andrew V. Kundrat
Attorney, Agent, or Firm—Nixon & Vanderhye

[57] ABSTRACT

A fence system is provided which is constructed from a plurality of composite strands extending between a plurality of spaced fence posts. Each of the composite strands includes an elongated, high-tensile strength core member encased in a relatively thick, solid plastic sheath fixedly secured to the core member. The strand may be made electrically conductive and may be formed with a variety of cross-sectional shapes. Staple-type or other fasteners are utilized to attach the composite strands to the fence posts. The fasteners conform at least to a portion of the strands and are limited as to their depth of penetration into the posts to ensure that the strands are free to move horizontally with respect to the fence posts.

27 Claims, 3 Drawing Sheets

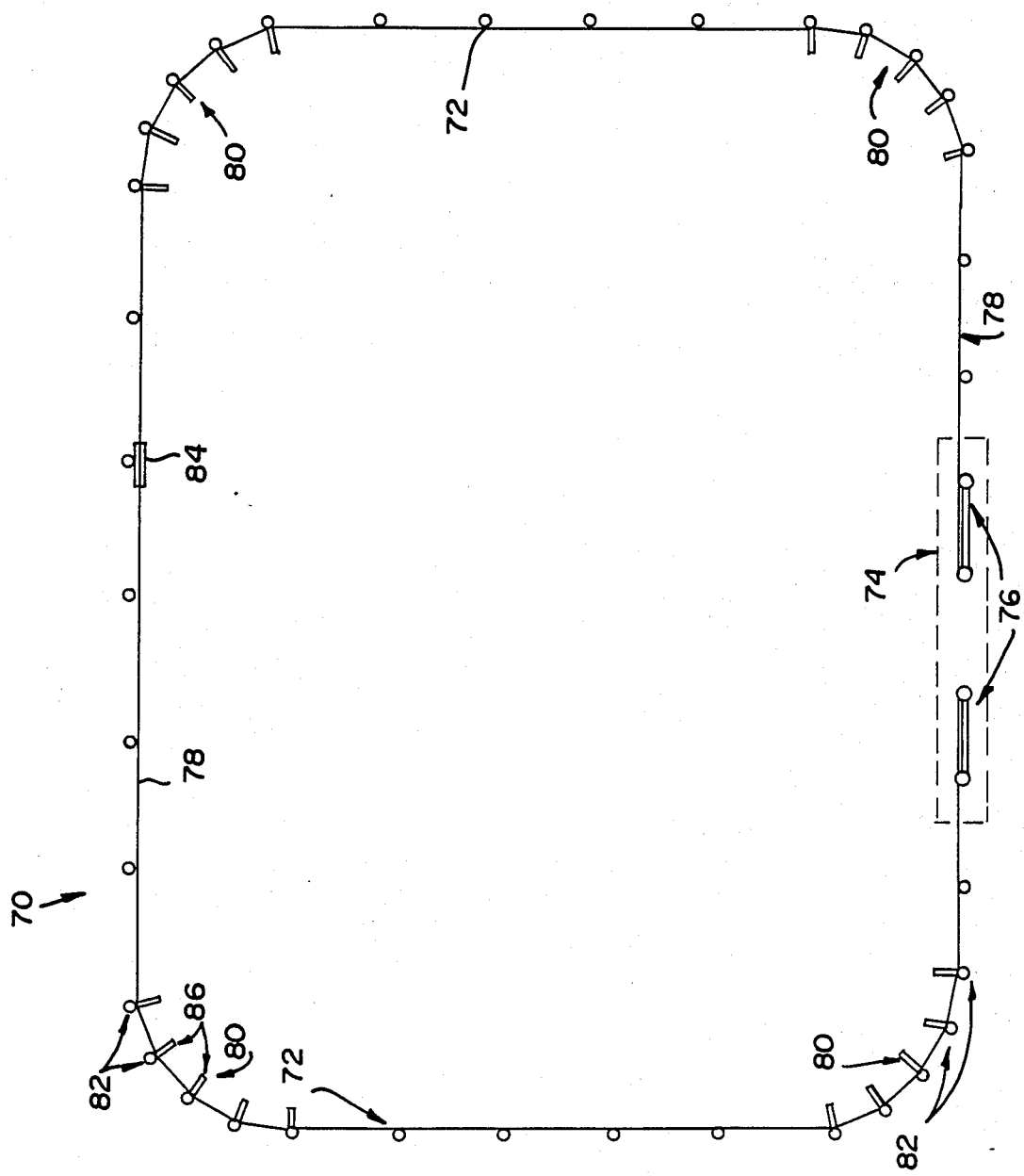

COMPOSITE STRAND FENCE

CROSS REFERENCE TO RELATED APPLICATIONS

This application is a continuation-in-part of co-pending U.S. patent application Ser. No. 643,008, filed Aug. 22, 1984 now Pat. No. 4,684,107, and of co-pending U.S. patent application, Ser. No. 892,042, filed Aug. 1, 1986 now Pat. No. 4,706,942. The teachings of such parent applications are expressly incorporated herein by reference.

BACKGROUND AND SUMMARY OF THE INVENTION

This invention relates to fencing systems and to materials which comprise the various components of such systems.

Fence materials are generally selected on the basis of initial and estimated maintenance costs, durability, strength, safety and appearance. The fencing material that has been most widely used due to its low cost of installation and up-keep is metal wire, both smooth and barbed.

However, wire fencing, and particularly barbed wire fencing suffers from the disadvantage that it can cause painful, unsightly and life-threatening injury to valuable livestock, particularly when the stock becomes agitated or disturbed, as frequently happens during storms, or in the event predators penetrate the area in which the livestock are confined. The problem is compounded by the fact that wire fencing, whether it be barbed wire or smooth wire, is very thin and difficult to see and, as a result, animals are correspondingly more apt to contact wire fences than other more visible fences, such as wood rail fences. Wire fencing is also generally regarded as having poor aesthetic qualities, and it tends to rust or corrode after a few years of service.

For enclosing or confining certain types of livestock, such as thoroughbred race horses or animals of similar value, wood fences have also been employed. While pleasing to the eye and relatively safe, wood fences are nevertheless expensive to install and maintenance costs are particularly high. Wood fences also have the disadvantage of causing serious and, sometimes, fatal injuries to animals.

In an effort to retain the visibility and pleasing aesthetics of wood fencing, and the low cost and maintenance of wire fencing, it has been proposed to construct fences of wire webbing with wooden boards meshed therein. However, the durability of these fences is limited again by cost and by the tendency of the wood to weather and rot.

It is also known in the prior art to use plastic rather than wood to increase durability and to decrease the cost of fencing. For example, U.S. Pat. No. 3,877,140 discloses a picket fence composed of metal and plastic. The fence described there is well suited for applications not requiring a great deal of strength, such as for snow fencing, but is not particularly suited to applications where strength is of considerable importance, such as for the confinement of livestock.

Despite such attempted improvements, the most common practice still is to utilize plain or barbed wire wherein single strands of wire are, in effect, substituted for wooden rails, slats, and the like. One other advantage of wire fencing is that it may be made to be electrically conductive so as to provide low voltage electrical shocks on contact. U.S. Pat. No. 3,669,413, for example, discloses a metallic electrical fence comprising spaced, insulated fence posts supporting, via L-shaped tabs, one or more elongated current-carrying uninsulated conductor wires supplied with electrical current from a remote source.

In U.S. Pat. No. 3,516,643, a fence for livestock use is disclosed utilizing a plurality of non-electrified wires in combination with a single, uncoated electrically-conductive wire supported on insulators attached via extension means to fence posts.

U.S. Pat. No. 3,350,066 discloses still another wire fence construction wherein spaced, weighted fence posts support a plurality of horizontal, non-coated wires which may be electrified or non-electrified. A plurality of spring-biased wire engaging hooks tightly clamp the wires to the fence posts.

In U.S. Pat. No. 3,223,796, an insulated, electrically-conductive fence wire structure is described wherein a single strand of wire is supported between spaced fence posts. The reference discloses a copper or other highly-conductive wire loosely encased in a rubber or other flexible insulating material sleeve. Since the patent discloses the use of only a single wire and since the wire is made of a relatively soft metal (e.g., copper), serious doubts exist as to its usefulness in confining animals, particularly large ones (such as horses or cattle). The reference also discloses that the conductive wire may be covered with a substantially solid insulation coating $\frac{1}{8}$ to 3/16 of an inch in thickness. The reference shows "conventional post connectors" that appear to fixedly hold the wire to the posts.

Also representative of known wire fence installations is a booklet published by United States Steel Corp. in 1980 entitled "How to Build Fences With USS Max-10 200 High Tensile Fence Wire". The booklet describes wire fence constructions utilizing varying numbers of smooth uncoated high-tensile wires connected to spaced fence posts by standard staple-type fasteners. Electrified versions are also described, utilizing insulated fasteners and short sections of tubular post insulators that loosely surround the wires.

Taking a different approach to conventional wire fencing, U.S. Pat. No. 4,111,399 discloses a fence comprising spaced fence posts supporting a series of horizontal as well as vertical strands of heavy gage wire. According to the reference, intermediate horizontal strands and all of the vertical strands are of a common gage, while the bottom and top horizontal strands are of a heavier gauge. In addition, the vertical spacing from top to bottom is varied, the lower horizontal strands closer together than the upper horizontal strands. All horizontal strands are secured to the posts using standard staple-type fasteners.

All of the above prior art wire fence constructions are unsatisfactory from the stand point that they lack aesthetic appeal, and they are oftentimes difficult to detect by livestock, horses or other animals by reason of the very small cross-sectional area of the individual wires. As previously indicated, the poor visibility associated with plain or barbed wire fences can lead to painful injury to the animals.

In my earlier U.S. Pat. No. 4,465,263, a composite metal and plastic fence system is disclosed which retains the visibility and attractiveness of wood fencing, but which has the high strength, low cost, low maintenance characteristics of wire fencing. The fence utilizes plastic webs reinforced by at least a pair of wires having high-tensile strength. In the preferred embodiment, the reinforcing wires are located at the upper and lower edges of the plastic web. In addition, installation of the fencing material is greatly facilitated by the use of uniquely configured brackets which provide vertical support for the webs.

In my co-pending parent application Ser. No. 643,008, various improvements in the earlier patented fence system are described which enable more effective and rapid installation of the fence. In one embodiment, a bracket is provided which not only encloses the wire reinforced plastic webbing, but also supports one or more low voltage conductive wires. In my other co-pending parent application Ser. No. 892,042, I disclose a fence system layout with concrete footings.

This invention relates to an improved wire strand for use not only in my prior metal and plastic composite fence systems, but also for use in a new wire strand fence system which overcomes the disadvantages of prior art wire fences. To this end, a composite strand is utilized which includes a high tensile strength elongated core member encased in a relatively thick coating of plastic material. The core member may be smooth, high-tensile strength steel wire, wire cable, glass fiber or synthetic fibers such as polyester, nylon polyester, polypropylene rope or cable, etc. The plastic coating or sheath may be polyvinyl chloride, polypropylene and rubber, or other thermoplastic olefin polymers or similar materials.

Various conventional techniques may be employed to encase the core member within the plastic sheath. In one exemplary embodiment, the plastic is extruded onto the core material so that the plastic is fixed to the strand, i.e., there is no relative sliding motion therebetween. Extruding plastic coatings onto wire strands is not in itself new, and reference is made to U.S. Pat. No. 4,182,382, which discloses a representative prior art plastic extruding technique.

The thickness of the applied plastic coating or sheath is such that the outside diameter of the composite strand is preferably from at least about 0.200 inch to about 0.750 inch.

In one aspect, the present invention relates to the use of a composite strand as described above in the metal and plastic fence system of my earlier filed co-pending application. In another aspect, the invention relates to a fence system wherein a plurality of composite strands extend between a plurality of fence posts to create a highly visible, safe and attractive barrier particularly well suited for livestock confinement.

The present invention contemplates a variety of cross-sectional shapes for the composite strand. For example, the plastic sheath or coating may be applied so as to impart to the overall strand a circular, oval, or semicircular cross-section, but other shapes may be employed with equal effectiveness.

It is also a feature of this invention that the composite strand be electrically non-conductive, conductive, or selectively conductive. In accordance with the invention, the composite strand may be made conductive by the addition of carbon black particles to the plastic sheath composition prior to extrusion, or by co-extruding a conductive stripe on the surface of the plastic sheath. Other methods, well known in the art, may also be employed.

The composite strand, of course, would preferably be predominantly white and the conductive stripe black. Nevertheless, other configurations are contemplated, such as black conductive stripes with a variety of other colors, fluorescent or non-fluorescent, reflective or non-reflective, etc., for enhancing visibility.

In another, related aspect, this invention relates to the use of fasteners for securing the coated wire to the fence post in such a manner that they are essentially prevented from any vertical movement within the confines of the fastener or bracket, but are permitted to move horizontally therein to compensate for expansion and/or contraction due to variations in temperature, and to allow tensioning of the wires at the end posts. Staple-type or other similar fastening hardware may be used, so long as the fasteners conform generally to the cross-sectional shape of the composite strand so as to substantially limit vertical displacement of the composite strands. Stop elements may be employed to limit penetration of the fasteners into the fence posts to ensure horizontal slidability of the composite strand.

It will be appreciated that the novel composite strand of this invention combines the high strength, low cost characteristics of wire with the high visibility, safety, and aesthetic features of wood.

Other objects and advantages attributable to the subject invention will be apparent from the detailed specification which follows.

BRIEF DESCRIPTION OF THE DRAWINGS

FIG. 11 is a schematic plan view of a fence line layout in accordance with this invention.

DETAILED DESCRIPTION OF THE INVENTION

Figure 1:
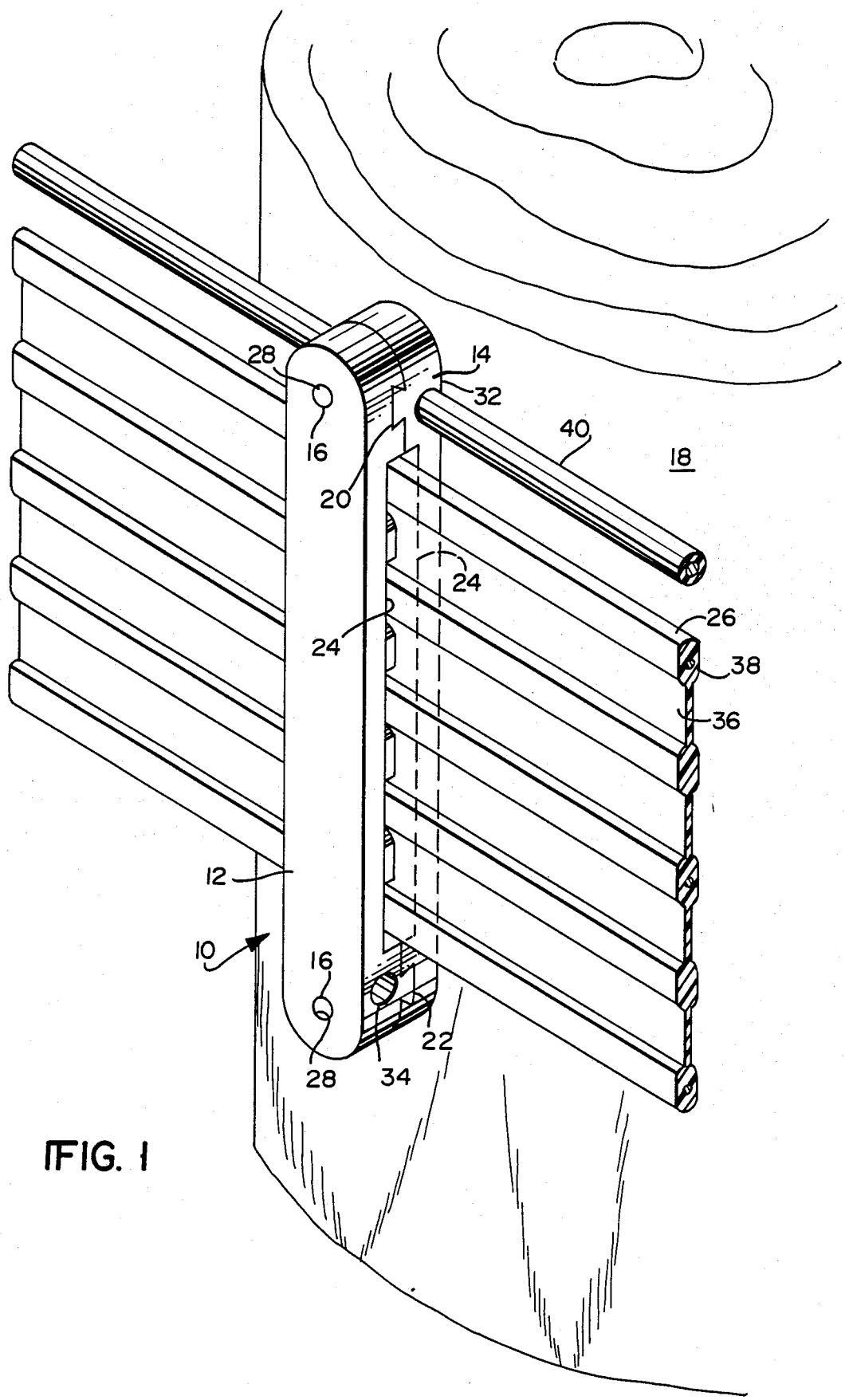
FIG. 1 is a perspective view of a bracket element for supporting an elongated web of fencing material and at least one electrically conductive composite strand in accordance with an exemplary embodiment of this invention.

Referring now to the drawings wherein like numerals designate corresponding parts throughout the several views, there is shown in FIG. 1 a portion of a composite metal and plastic fence, and an associated bracket 10 of the type disclosed in my earlier-filed, co-pending parent application Ser. No. 643,008. The bracket 10 is formed with two bracket elements 12 and 14, each of which has openings 16 for receiving fastening nails to secure the elements to the fence post. On the inner face of each of the ends of the bracket element 12 and 14, a dove tail joint is provided in the form of a sloped wall channel 20 at one end, and a complimentary tongue 22 at the opposite end. Thus, the tongue 22 of one of the bracket elements will fit into the channel 20 of the other bracket element, as illustrated. With this arrangement, separation of the bracket elements 12 and 24 will be prevented in the event that the bracket 10 becomes separated from the fence post 18.

The fence rail material 26 comprises plastic in the form of flat web portions 36 extending between raised beads or ribs 38, at least some of which encase high-tensile wires. In FIG. 1, the upper and lower edge beads and an intermediate bead are shown to encase a reinforcing wire.

The bracket elements 12 and 14 together define an elongated recess 24 which receives the plastic rail 26. It will be understood from my parent application that the bracket 10, when mounted to a fence post 18 by nails or other suitable fasteners 28, will provide vertical support to the rail material 26. At the same time, the rail 26 is free to slide horizontally within the bracket to compensate for expansion and contraction due to variations in temperature, and to enable the rail to be tensioned as desired.

As further illustrated in FIG. 1, apertures 32, 34 are provided in each bracket element for receiving a low-voltage conductive wire 40. In accordance with this continuation-in-part application, wire 40 is a composite strand comprising an elongated high-tensile strength core 44 member encased in a plastic sheath 42. The strand construction, and the manner in which it is made electrically conductive, is described further hereinbelow.

It will be understood that apertures 32, 34 are sized to permit horizontal sliding movement of the composite strand 40 in the same sense that fence rail 26 is slidably supported in the recess 24 of bracket 10.

Figure 2:
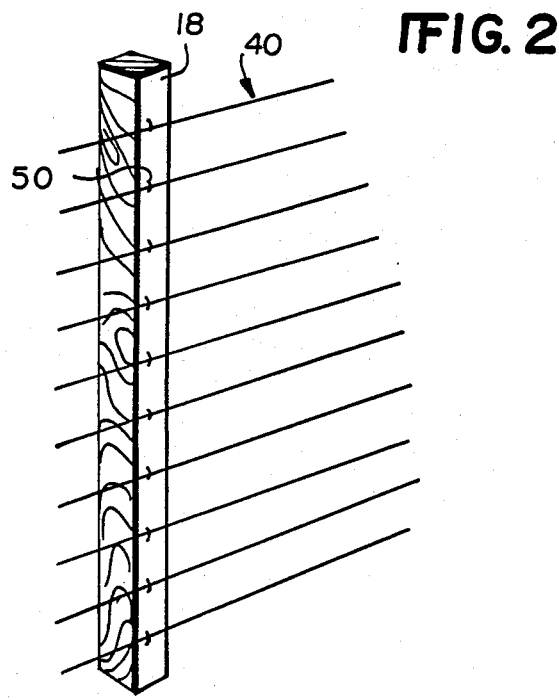
FIG. 2 is a perspective view of part of wire fence system components according to an exemplary embodiment of this invention including a plurality of composite strands attached to a fence post.

Turning now to FIG. 2, an exemplary embodiment of this continuation-in-part application is shown wherein a plurality of composite strands 40 are themselves utilized as the fence material. As shown, ten such composite strands are arranged vertically on a fence post 18. A fence system so configured creates an effective barrier to animal egress or ingress vis-a-vis the area bounded by the fence. The composite strands also provide a highly-visible barrier which not only enables the livestock to see the fence, but also protects the livestock from injuries caused by contact with the typical wire fence constructions utilized in the past. It will be understood, of course, that while ten composite strands are shown in FIG. 2, the number of strands may vary in accordance with the circumstances surrounding the use of the fence. For example, an eight strand fence may be suitable for cattle grazing, while a twelve strand fence may be desired for full grown horses, colts, etc. Of course, smaller animals may require a lesser number of strands. A ten strand fence, on the other hand, offers a versatile design which represents a compromise between the eight and twelve strand fences, but which may, in fact, prove to be effective in all cases.

It will further be understood that the vertical space between adjacent composite strands may be adjusted as required. For example, the vertical spacing between the strands at the lower end of the fence posts may be smaller than the spacing between the upper strands so that smaller domestic or wild animals may be kept out of the enclosed area.

Figure 3:
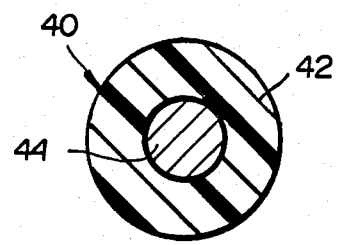
FIG. 3 is a cross-sectional view of a composite strand in accordance with this invention.

In FIG. 3, there is shown a cross-section of a composite strand in accordance with an exemplary embodiment of this invention. The strand 40 is shown to include a high-tensile strength wire 44 encased in a plastic sheath or coating 42 of generally circular cross-section. The high-tensile strength core member 44 may be a conventional 12½ gage galvanized of non-galvanized steel wire. It will be understood that 14½ or 16 gage wire may also be used, depending upon strength requirements of the fence. In addition, wire cable, glass fiber or synthetics such as polyester or nylon polyester fibers, as well as polypropylene ropes or cables may also be used as the core member in the composite strand.

The plastic sheath or coating 42 which surrounds, or encases, the core member 44 is applied to the core in such a way that no relative sliding movement between the core and the sheath is permitted. In one exemplary embodiment of the invention, the sheath or coating 42 is extruded onto the core member.

In accordance with this invention, the plastic sheath 42 is preferably formed of polyvinyl chloride, polypropylene with rubber added, or other suitable thermoplastic olefin polymers. However, it is specifically contemplated that any plastic or comparable material may be utilized as the sheath.

The outside diameter of the composite strand is preferably between about 0.200 inch and about 0.500 inch, although it may be as large as about 0.750 inch or larger,. Utilizing a standard wire gage of 12½ for the core material 44, it will be appreciated that the plastic sheath 42 should be between about 2 and about 7 times the thickness of the core member for best results.

Figure 4:
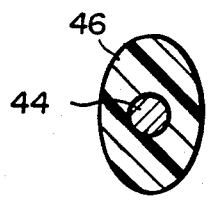
FIGS. 4 and 5 are cross-sectional views of alternative cross-sectional profiles for a composite strand in accordance with this invention.
Figure 5:
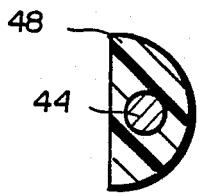

FIGS. 4 and 5 illustrate alternative cross-sectional shapes for the composite strand. In FIG. 4, the plastic sheath 46 is given an oval cross-section, while in FIG. 5, the plastic sheath 48 is given a semi-circular or half-moon cross-section. Both of these alternative embodiments offer highly visible profiles, which are easily seen by livestock. It will be understood that these are only representative of a variety of cross-sectional shapes which may be imparted to the strand by, for example, changing the extrusion die configuration.

Figure 6:
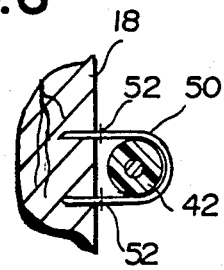
FIGS. 6, 7 and 8 are sectional views illustrating staple fastener members for use with round, oval and semi-circular composite strands.
Figure 7:
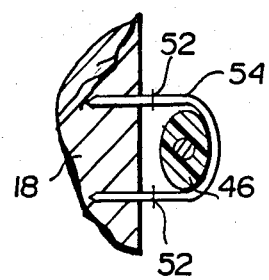
Figure 8:
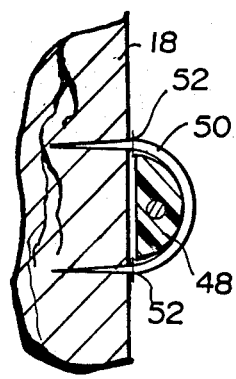

FIGS. 6, 7 and 8 illustrate staple-type fasteners for attaching the variously shaped composite strands to a fence post 18. In FIG. 6, a staple-type fastener 50 which conforms closely to approximately half of the circular cross-section of the strand 40 is shown with stop elements 52 which limit penetration of the staple into the fence post to ensure that the composite strand will be able to slide horizontally with respect to the staple and the fence post. At the same time, because the contour of the staple follows the circular cross-section of the strand, through at least 180°, the composite strand is prevented from moving vertically any appreciable distance within the staple member.

In the FIG. 7 embodiment, the staple 54 has a shape which conforms, again, to at least half of an oval shaped plastic sheath 46, and is also provided with stop elements which function in the same manner as those described with respect to the staple illustrated in FIG. 6.

In FIG. 8, a staple 50 of the type used with the circular cross-section strand of FIG. 6, is shown in association with a semi-circular or half-moon cross-section strand 48. As will be appreciated from FIG. 8, the half-moon cross-section affords a greater degree of surface contact between the strand and the fence post.

Figure 9:
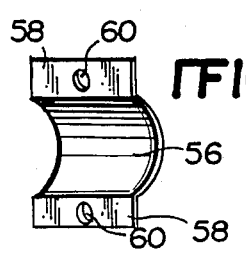
FIG. 9 shows a perspective of an alternative fastener member for attaching a composite strand to a fence post.

In FIG. 9 there is shown still another fastening member for use with composite strands as described herein. The body 56 of the fastener is shown to have a semi-circular shape much like the staple 50 in FIG. 6 but, rather than penetrating legs and stop elements, the fastener in FIG. 9 is provided with laterally-extending flanges 58 provided with aperture 60 for receiving nails or similar fasteners. The body portion 56 may be shaped, of course, in alternative configurations to correspond to the cross-sectional shape of at least a portion of the strand.

Figure 10:
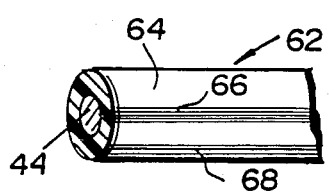
FIG. 10 is a perspective view of an electrically conductive composite strand in accordance with this invention.

Turning now to FIG. 10, there is shown a perspective view of a composite strand 62 including an elongated core member 44 encased in a plastic sheath 64 provided with an electrically-conductive stripe 66. The electrically-conductive stripe 66 contains carbon black particles or other similar material, and may be co-extruded with the plastic sheath 64 in a manner well understood by those of ordinary skill in the art. While only one conductive stripe is shown, two or more may be included about the periphery of the strand. Alternatively, the plastic sheath itself may contain carbon black particles or the like. It will be understood that the strand may thus be made entirely or only selectively electrically conductive as desired.

In the event the composite strand is made electrically conductive, fasteners or brackets will be insulated, or alternatively, insulators will be inserted over the strand at the point of engagement between the strand and the brackets or other fasteners. In this regard, the fasteners or brackets may themselves be plastic or coated with plastic or other insulating material.

A second elongated stripe 68, extending parallel to the electrically-conductive stripe 66 is shown in FIG. 9, and is designed to provide enhanced visibility of the composite strand. It is further contemplated by this invention that one or more stripes 68 may be fluorescent or contain reflective particles to even further enhance the visibility of the strand.

In FIG. 11, there is shown a schematic plan view of a fence line layout in accordance with an exemplary embodiment of the invention.

As can be seen, the fence line layout 70 comprises a plurality of fence posts 72 which are partially implanted into the ground and are disposed in an array so as to define an area to be enclosed. The fence line layout 70 includes at least one termination or gate post assembly 74 which preferably includes first and second gate post members 76. Each of the gate post members 76 includes at least one of the fence posts 72. In the preferred embodiment, a plurality of composite strands 78 are coupled at ends thereof to the first and second gate post members 76, respectively, of the gate post assembly 74 and are slideably coupled to each of the fence posts 72 that are disposed between the gate post members 76.

While in the illustrated embodiment only one gate post assembly is shown, it is clear that any number of gate post assemblies could be provided about the periphery of the enclosure so as to provide a number of gate openings thereabout. It is also contemplated that the present invention could be utilized to create a termination assembly where there is no gate or entry way, such as the inside fence at a thoroughbred race track.

The fence line layout 70 further includes a plurality of corner assemblies 80 which are provided, preferably, where the fence line deviates substantially from a straight line. In the illustrated embodiment, there are four corner post assemblies, however, any number of corner post assemblies could be provided along the fence line layout 70. Further, in the illustrated embodiment, each of the corner post assemblies comprises five corner posts 82. Of course, any number of corner posts could be provided at each corner post assembly.

The fence line layout 70 is also provided with at least one tensioning assembly 84 for tensioning each of the composite strands of fencing material. It will be understood that any number of tensioning devices may be employed for example, a number equal to the number of composite strands used in the fence system may be used if desired. The tensioning means are preferably located at the termination points of the composite strands.

In the illustrated embodiment, the composite strands 78 extend along the interior of the corner posts 82; however, the composite strands may pass along the exterior of the gate post relative to the enclosed area. As further seen in FIG. 11, each of the corner posts 82 is provided with a foot portion 86 which extends inwardly relative to the fence line. The foot portion 86 secures and stabilizes the associated corner post 18 as described in my earlier co-pending application Ser. No. 892,042.

Accordingly, the present invention provides a fence system which has all the advantages of prior art wire fence systems, but which affords a degree of visibility, safety and attractiveness heretofore not available with such systems.

While the present invention has been shown and described in terms of what is regarded presently as its most practical embodiments, many alterations may be made to the subject invention without departing from the spirit and scope thereof as defined in the claims which follow.

What is claimed:

1. A fence system comprising a plurality of spaced fence posts supporting a plurality of vertically spaced, generally horizontally extending composite strands, each of said composite strands having a substantially semicircular cross-sectional shape, and each composite strand comprising an elongated, high-tensile strength core member fixedly encased in a relatively thick, solid plastic sheath, said system further comprising means for attaching said composite strands to said fence posts such that said strands are free to move horizontally with respect to said fence posts.

2. A fence system as defined in claim 1, wherein said composite strand has an outer curved surface with a radius of at least about 0.100 inch.

3. A fence system as defined in claim 2, wherein said plastic sheath comprises a thermoplastic olefin or vinyl polymer.

4. A fence system as defined in claim 2, wherein said plastic sheath comprises polyvinyl chloride.

5. A fence system as defined in claim 2, wherein said plastic sheath comprises a polypropylene/rubber composition.

6. A fence system as defined in claim 2, wherein said elongated core member comprises metal wire or cable.

7. A fence system as defined in claim 6, wherein said metal wire comprises 12½ gage, high-tensile strength steel wire.

8. A fence system as defined in claim 2, wherein said elongated core member comprises a synthetic fiber.

9. A fence system as defined in claim 2, wherein said elongated core member comprises a glass fiber.

10. A fence system as defined in claim 2, wherein said core member comprises metal wire and said plastic sheath comprises a thermoplastic olefin or vinyl polymer.

11. A fence system as defined in claim 2, wherein said core member comprises a glass fiber and said plastic sheath comprises a thermoplastic olefin or vinyl polymer.

12. A fence system as defined in claim 1, wherein said attaching means comprises fasteners, each of which has a cross-sectional shape similar to at least a portion of said composite strands, and including leg members adapted to penetrate said fence posts.

13. A fence system as defined in claim 1, wherein said plastic sheath is electrically conductive.

14. A fence system as defined in claim 3, wherein said thermoplastic olefin or vinyl polymer contains means for providing electrical conductivity to said composite strand.

15. A fence system as defined in claim 1, wherein said plastic sheath includes at least one electrically-conductive stripe of a color contrasting with said sheath.

16. A fence system as defined in claim 1, wherein said attaching means prevent any substantial vertical movement of said composite strands within said attaching means.

17. A fence system as defined in claim 13, wherein said means for attaching said composite strands to said fence posts are electrically insulated.

18. A fence comprising, in combination, an elongated web of plastic material extending between a plurality of fence ports, said web having spaced substantially parallel edges along its length, each edge having a bead, a high-tensile wire embedded in each bead along the length of said material, a substantially flat portion extending between said beads, a plurality of support bracket means each having means for attachment to a post, each bracket means having a first and a second bracket element defining a recess means for receiving said elongated web, the dimensions of said recess means, when said bracket elements are joined together being such that vertical support is provided for said web while allowing said web to slide in a longitudinal direction, each of said bracket means further including at least one aperture extending in a direction parallel to said elongated web, an electrically-conductive composite strand slidably received in said at least one aperture, said composite strand comprising an elongated high-tensile strength core member encased in a relatively thick, solid plastic sheath.

19. A fence as defined in claim 18, wherein said elongated core member comprises high-tensile wire and said sheath comprises a thermoplastic olefin or vinyl polymer.

20. A fence as defined in claim 19, wherein said thermoplastic olefin or vinyl polymer contains conductive metal particles.

21. A fence as defined in claim 18, wherein said plastic sheath is extruded onto said elongated core, and wherein said sheath has an outside diameter of from about two to about seven times the diameter of said elongated core member.

22. A fence as defined in claim 19, wherein said high-tensile wire is 12½ gage wire and said composite strand has an outside diameter of at least about 0.200 inch.

23. A fence as defined in claim 18, wherein said composite strand is formed with a plurality of contrasting stripes extending along said strand, at least one of said stripes being electrically conductive.

24. A fence system as defined in claim 18, wherein at least one of said stripes is fluorescent.

25. A fence as defined in claim 18, wherein said composite strand is formed with a substantially semi-circular cross-sectional shape.

26. A fence as defined in claim 18, wherein said composite strand is formed with a substantially oval cross-sectional shape.

27. A fence as defined in claim 18, wherein said composite strand is formed with a substantially circular cross-section.

* * * * *